United States Patent [19]
Buehner

[11] 3,777,193
[45] Dec. 4, 1973

[54] RECTIFIER BRIDGE ASSEMBLY
[75] Inventor: Hans-Friedrich Buehner, Pielmuhle, Germany
[73] Assignee: Siemens AG, Berlin and Munich, Germany
[22] Filed: Feb. 8, 1973
[21] Appl. No.: 330,885

[30] Foreign Application Priority Data
Feb. 24, 1972 Germany.................. P 22 08 794.1

[52] U.S. Cl. .............................. 310/68 D, 321/8 R
[51] Int. Cl. ......................................... H02k 11/00
[58] Field of Search.................... 310/68 D; 321/8 R

[56] References Cited
UNITED STATES PATENTS

| 3,329,841 | 7/1967 | Binder et al. | 321/8 R X |
| 3,422,339 | 1/1969 | Baker | 321/8 R |
| 3,629,631 | 12/1971 | Cotton et al. | 310/68 D |
| 3,684,944 | 8/1972 | Evgrafov | 321/8 R |
| 3,641,374 | 2/1972 | Sato | 310/68 D |

Primary Examiner—William M. Shoop, Jr.
Attorney—Carlton Hill et al.

[57] ABSTRACT

A rectifier bridge assembly particularly suitable for use with an alternator having a voltage regulator controlled excitation winding, which assembly incudes two flat d.c. conductors lying in a single first plane, two or more a.c. conductors lying in a third plane, a layer of insulating material lying in a second plane, mechanically supported by the d.c. conductors and lying between the first and third planes, and two or more pairs of serially connected rectifiers arranged between the a.c. conductors and the d.c. conductors, one pole of the rectifiers in each pair of rectifiers being directly connected to one of the d.c. conductors and the other pole being directly connected to one of the a.c. conductors. A further d.c. conductor is disposed in the same plane as said a.c. conductors which further d.c. conductor is electrically insulated from the first mentioned d.c. conductors as well as from the a.c. conductors. The further d.c. conductor is directly connected to one pile of each of two or more further rectifiers and the other pole of each of the further rectifiers is directly connected to a diffeent one of the a.c. conductors. The said further conductor has a plurality of spaced tabs corresponding in number to the number of said a.c. conductors, which tabs extend out of the plane of said a.c. conductors to points respectively above the individual a.c. conductors. An excitation rectifier is directly mounted between said a.c. conductors and said ends of said tabs. The first mentioned rectifiers are mounted directly on one or the other of the first mentioned d.c. conductors within individual wells in the insulating layer. The further regulators are for use in the voltage regulator circuit of the excitation winding of the alternator. Instead of having the spaced tabs on the further conductors, the tabs may be on the a.c. conductors and extend above the further conductor.

12 Claims, 4 Drawing Figures

PATENTED DEC 4 1973　　3,777,193
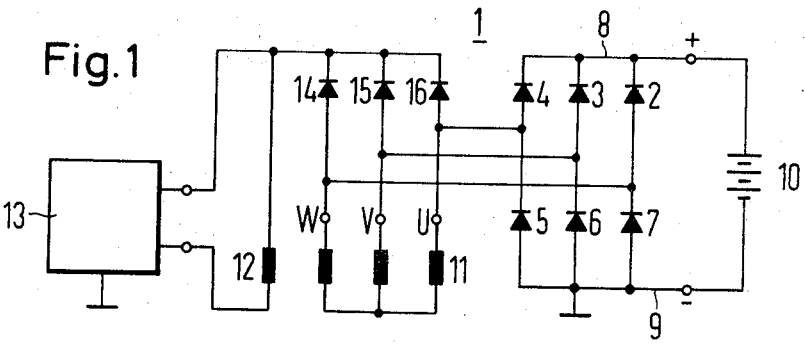
Fig.1
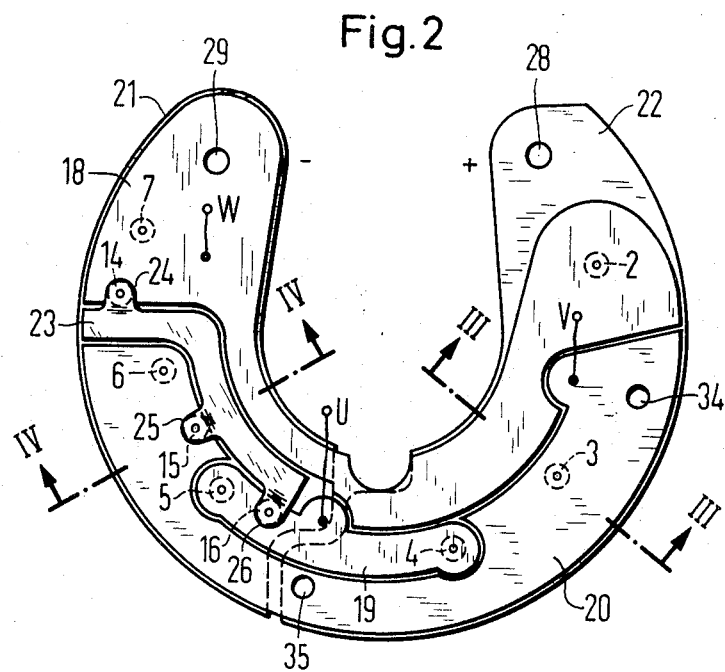
Fig.2
Fig.3　　Fig.4

RECTIFIER BRIDGE ASSEMBLY

BACKGROUND OF THE INVENTION

Polyphase rectifier bridges have found increasing use in connection with alternators used in motor vehicles. In a known three-phase rectifier bridge of this kind, the a.c. conductors of the bridge are in the form of conductor paths on printed circuit boards. Each of these a.c. conductors is connected to the positive or negative pole of two rectifiers, while the other pole is soldered to one or the other of two d.c. conductors. In a known form of this structure, the d.c. conductors form the support member for the rectifier bridge and also serve to dissipate the heat which is generated.

A rectifier bridge of this kind is particularly suitable for rectifying the current supplied by three-phase alternators used on motor vehicles. A bridge of this kind may be designed to be very thin so that it will occupy a relatively small amount of space. It is usually mounted at the end of an alternator (a.c. generator), so that the alternator, together with the rectifier bridge, can be considered as one component. Such an arrangement has sometimes been referred to in the industry as a commutator-free d.c. generator.

The voltage supplied by the rectifier bridge forms the main electrical power supply of a motor vehicle, and therefore should be maintained substantially constant and independent of the load and of the rotational speed. At least part of the rectified voltage is usually connected to a regulator, the output voltage of which determines the current in the excitation winding of the alternator. The output voltage of the alternator is thus maintained substantially constant independent of the rotational speed and the load of the alternator.

The output a.c. voltage of the alternator is usually used as the control parameter for the regulation process and is rectified by means of further rectifiers, commonly referred to as excitation diodes, and is fed to the regulator. Prior to the present invention, these excitation diodes were components not structurally associated with the generator or with the rectifier bridge.

One particular form of prior art rectifier bridge assembly is described in Toshiba Review, November, 1970, Pages 23 to 27.

BRIEF SUMMARY OF THE INVENTION

The invention comprises a rectifier bridge having two flat d.c. conductors lying in a first plane, two or more a.c. conductors lying in a third plane, a layer of insulating material lying in a second plane between the first and third planes, which insulating layer is mechanically connected to the d.c. conductors and four or more rectifiers arranged between the a.c. conductors and the d.c. conductors, one pole of the rectifiers in each pair being directly connected to one of the d.c. conductors and the other poles being directly connected to one of the a.c. conductors. Between the a.c. conductors there is arranged a further conductor which is electrically insulated from the d.c. conductors and the a.c. conductors and which is directly connected to one pole of each of two or more further rectifiers; the other pole of each of the further rectifiers being directly connected to an individual one of the a.c. conductors.

In a three-phase rectifier bridge, there are provided three a.c. conductors to each of which one pole of each of two rectifiers is directly connected, and there are provided three further rectifiers one pole of each being directly connected to the further conductor and the other pole of each of which being directly connected to an individual one of the three a.c. conductors. In a preferred embodiment the a.c. conductors and the further conductor are in the form of flat conductor paths, the further conductor path is provided with tabs or projections which lie above the a.c. conductor paths, and the further rectifiers are arranged between the projections and the a.c. conductor paths. The a.c. conductor paths may be provided with the projections and arranged to lie above the further conductor path. Advantageously, all the conductor paths and the layer of insulating material are comprised in a printed circuit board. In addition to the excitation diodes, other components or component assemblies, e.g. of the regulator can be arranged on the rectifier bridge.

It is an object of the present invention to provide a novel form of rectifier bridge assembly which is rugged and reliable in use.

A further object of the present invention is to provide a novel rectifier bridge assembly adapted to be mounted on the end of an alternator which includes the voltage regulating diodes as an integral and compact part of the bridge assembly.

BRIEF DESCRIPTION OF THE DRAWINGS

FIG. 1 is a circuit diagram of a three-phase rectifier bridge together with the stator windings of a three-phase alternator, a voltage regulator connected to the excitation winding and excitation diodes in the regulator circuit;

FIG. 2 is a plan view of a rectifier bridge assembly embodying the novel features of the present invention;

FIG. 3 is a sectional view taken along the line III—III of FIG. 2; and

FIG. 4 is a sectional view taken along the line IV—IV of FIG. 2.

DESCRIPTION OF THE PREFERRED EMBODIMENT

Referring to FIG. 1 of the drawings, there is shown therein a three-phase rectifier bridge comprising six rectifiers 2, 3, 4, 5, 6 and 7. These rectifiers are serially connected in pairs and each series connected pair is connected between d.c. conductors 8 and 9. Specifically, rectifiers 2 and 7 are connected in series so as to be poled in the same direction and connected across conductors 8 and 9. Similarly rectifiers 3 and 6 are connected between conductors 8 and 9, as are also rectifiers 4 and 5. A load to which the d.c. conductors are arranged to be connected is diagrammatically indicated by the battery 10. It will, of course, be understood that other loads may be connected to these conductors 8 and 9 to be fed thereby.

The alternator is diagrammatically represented by the main windings 11 having output terminals U, V and W. This generator 11 includes an excitation winding 12. Since it is desirable and often necessary that the a.c. output of the alternator 11 have its voltage maintained at a constant level, a voltage regulator 13 is provided which is connected to the excitation winding 12 of the generator. The a.c. output from terminals U, V and W is connected respectively to the mid-points between rectifiers 2–7, 3–6 and 4–5. The output terminals U, V and W are also connected to additional rectifiers 16, 15 and 14 to supply a d.c. voltage to the voltage regulator which is a function of the a.c. voltage output of the generator 11.

The mode of operation of the regulator of the type diagrammatically illustrated is generally known so that an explanation of its operation need not be set forth. If the voltage of the alternator increases, e.g. due to an increase in rotational speed, the voltage at the cathodes of the rectifiers 14, 15 and 16 likewise increases. This causes the regulator 13 to be fed with a higher voltage relative to zero volts and thus produces a reduction in the voltage across the excitation winding 12. The output voltage of the regulator is thereby reduced.

In FIG. 2, a rectifier bridge assembly is shown embodying the novel features of the present invention. Certain reference numerals in FIG. 2 correspond to similar numerals in FIG. 1 and represent the same component or part.

The three-phase bridge comprises two flat d.c. conductors 21 and 22, each of which consists e.g. of a 2mm thick aluminum plate. These flat conductors form the support members for the bridge and also serve to secure the bridge to the generator housing. Three a.c. conductor paths 18, 19 and 20 are secured to the d.c. conductors 21, 22, the d.c. conductors and the a.c. conductor paths being insulated from one another by a layer of insulating material which is not visible in FIG. 2 (but is shown in FIGS. 3 and 4), and are mechanically connected to one another. The insulating layer and the a.c. conductor paths in this embodiment are in the form of a printed circuit board, the electrical isolation of the a.c. conductor paths being produced in known manner by etching. The d.c. conductors lie in a first plane, the layer of insulating material in a second plane, and the a.c. conductor paths 18, 19 and 20 in a third plane.

Beneath each of the a.c. conductor paths 18, 19 and 20 there are provided two recesses in which are located rectifiers 2, 7 and 4, 5 and 3, 6 respectively. One pole of each of the rectifiers 7, 6 and 5 is connected to the d.c. conductor 21 and one pole of each of the rectifiers 2, 3 and 4 is connected to the d.c. conductor 22. The poles of the rectifiers 7 and 2, which, considered from the observer, lie at the top in FIG. 2 are connected to the a.c. conductor path 18, those of the rectifiers 6, 3 are connected to the a.c. conductor path 20 and those of the rectifiers 4, 5 are connected to the a.c. conductor path 19 e.g. by soldering.

Between the a.c. conductor paths 18, 19 and 20 and in the same plane thereto, is arranged one further conductor path 23, which is provided with projections 24, 25 and 26. These projections extend respectively over the a.c. conductor paths 18, 20 and 19, and are offset from the plane of the conductor path 23 by a distance which provides room for excitation diodes 14, 15, 16 respectively between the said projections and the a.c. conductor paths 18, 20, 19. The excitation diodes are connected to the projections and the conductor paths e.g. by soldering.

FIG. 3 shows a section through the arrangement shown in FIG. 2, along the line III—III, from which it may be seen that the rectifier 3 lies in a recess in a layer 30 of insulating material. The rectifier 3 is soldered to the d.c. conductor 22 and the a.c. conductor path 20 by the soldered joints 31. The rectifier 3 is firstly soldered onto the circuit board 22, subsequently the layer 30 of insulating material with the conductor paths 18 and 20 is inverted thereupon, and the lead of the rectifier 3 is soldered to the conductor path 20.

FIG. 4 shows a section through the arrangement shown in FIG. 2 along the line IV—IV. It can be seen that the further conductor path 23 is also part of a printed circuit board, the insulating part of which is marked 33. It is simpler, however, to secure the projection 25 on the conductor path 23 e.g. by soldering and to solder the projection 25 by solder 32 to the excitation diode 15. The rectifier bridge can be secured to the generator by means of members passing through holes 28, 29, 34, 35 (FIG. 2).

For protection against damp, dirt or salt vapour, the entire rectifier bridge is provided with a lacquer layer, which is not of such a thickness that it noticeably reduces heat emission from the bridge.

It will be apparent that many modifications and variations may be effected without departing from the scope of the novel concepts of this invention.

I claim as my invention:

1. A three-phase rectifier bridge arranged to be mounted on the end of an alternator comprising a three layer sandwich arranged in the shape of a yoke of substantially horseshoe configuration which includes a first layer formed of two electrically separated coplanar conducting segments, a second layer formed of insulating material mounted on and supported by said first layer segments, and a third layer formed of four segments disposed in a single plane on said insulating layer, said first layer segments forming conducting paths for supplying d.c. to a load, three of said third layer segments providing a.c. paths from a three-phase alternator, said insulating layer including six wells in each of which is mounted a diode, three of said diodes having their cathodes connected respectively to each of said three third layer segments and having their anodes connected to one of said first layer segments, the remainder of said diodes having their cathodes connected to the other one of said first layer segments and their anodes connected respectively to said three third layer segments, three additional diodes mounted on top of said third layer segments respectively and having one terminal of each connected to said third layer segments respectively, said fourth third layer segment being electrically connected to the other terminal of each of said additional diodes.

2. A rectifier bridge as set forth in claim 1, in which said electrical connections are provided by tabs extending outwardly from said three third layer segments above said fourth third layer segments, said additional diodes being located between said tabs and said third layer segments.

3. A rectifier bridge as set forth in claim 1, in which said electrical connections are provided by tabs extending outwardly from said fourth segment of said third layer above said three third layer segments respectively, said additional diodes being located between said tabs and said fourth third layer segment.

4. A rectifier bridge comprising two flat d.c. conductors lying in a first plane, two or more a.c. conductors lying in a third plane, a layer of insulating material lying in a second plane between the first and third plane and which is mechanically connected to the d.c. conductors and four or more rectifiers arranged between the a.c. conductors and the d.c. conductors, one pole of the rectifiers in each pair being directly connected to one of the d.c. conductors and the other pole being directly connected to one of the a.c. conductors, wherein between the a.c. conductors and in the same plane there is a further conductor which is electrically insulated from the d.c. conductors and the a.c. conductors, a plurality of further rectifiers, said further conductor being directly connected to one pole of each of said further rectifiers; the other pole of each of said further rectifiers being directly connected respectively to an individual one of said a.c. conductors.

5. A rectifier bridge as set forth in claim 4, in which there are three a.c. conductors, to each of which one pole of each of two rectifiers is directly connected, and in which there are provided three further rectifiers one pole of each being directly connected to said further conductor and the other pole of each being directly connected to an individual one of said three a.c. conductors.

6. A rectifier bridge as set forth in claim 5, in which the a.c. conductors and the further conductor are in the form of flat conductor paths, wherein said further conductor path is provided with projections which lie above the a.c. conductor paths, and wherein said further rectifiers are arranged between said projections and said a.c. conductor paths.

7. A rectifier bridge as set forth in claim 5, wherein said a.c. conductors and said further conductor are in the form of flat conductor paths, wherein said a.c. conductor paths are each provided with a projection, each of which lies above said further conductor path, and wherein said further rectifiers are arranged respectively between said projections and said further conductor path.

8. A rectifier bridge as set forth in claim 7, wherein all the conductor paths and the layer of insulating material are formed as a printed circuit board.

9. A rectifier bridge as set forth in claim 7, wherein the components thereof are assembled to form a structure the outline of which is horseshoe shaped.

10. A three-phase rectifier bridge arranged to be mounted on the end of an alternator comprising a three layer sandwich arranged in the shape of a yoke of substantially horseshoe configuration which includes a first layer formed of two electrically separated coplanar segments, a second layer formed of insulating material mounted on and supported by said first layer segments, and a third layer formed of four segments disposed on said insulating layer, a first one of said four segments extending generally around the inner marginal portion of said yoke, a second one of said four segments extending generally around the other marginal portion of said yoke, a third one of said four segments extending over a portion of the bight of said yoke between and spaced from said first and second ones of said four segments, and a fourth one of said four segments extending in spaced relation between said other segments, said fourth one of said four segments having tabs extending out of the plane of said third layer and providing a space between each tab and the plane of said third layer to points respectively above said first, second and third ones of said four segments, at least one diode disposed between each tab and said first, second and third segments respectively and one of said first layer segments, and diodes respectively located between said first, second and third segments and the other one of said first layer diodes, said first, second and third layer segments being arranged to be connected to a three-phase alternator and said fourth layer segments being arranged to be connected to a voltage regulator and to an excitation winding of said alternator, and said segments of said first layer being connected to a pair of load terminals, said diodes connected to said segments of said first layer being poled to provide a rectifying bridge and said diodes connected to said tabs being poled to coact with a voltage regulator to perform a regulator function for said excitation winding.

11. A flat, generally horseshoe shaped, rectifier bridge and alternator excitation diode assembly comprising: two coplanar flat d.c. conductors forming a first layer of generally horseshoe shape, an insulating layer overlying said first layer, a third layer disposed on said insulating layer comprising a printed circuit board having a plurality of coplanar disposed a.c. conductors, a plurality of pairs of diodes, each pair being serially connected between said two d.c. conductors, said a.c. conductors being connected to the mid-point of each pair of diodes respectively, a further set of diodes corresponding in number to said number of pairs of diodes, said further diodes being connected between said a.c. conductors and a d.c. conductor arranged to be connected to a terminal of a voltage regulator and to a terminal of a generator excitation winding, said insulating layer having a plurality of wells in which said plurality of pairs of diodes are contained and mounted, said further diodes being mounted on said a.c. conductors above said third layer.

12. A poly-phase rectifier bridge arranged to be mounted on the end of an alternator comprising a three layer sandwich arranged in the shape of a yoke of substantially horseshoe configuration which includes a first layer formed of two electrically separated coplanar conducting segments, a second layer formed of insulating material mounted on and supported by said first layer segments, a third layer formed of a plurality of conducting segments disposed in a single plane formed on said insulating layer, said first layer segments forming conducting paths for supplying d.c. to a load, said third layer segments providing a.c. paths from a poly-phase alternator, said insulating layer including twice the number of wells in each of which a diode is mounted, half of said diodes having their cathodes connected respectively to each of said third layer segments and having their anodes connected to one of said first layer segments, the remaining of said diodes having their cathodes connected to the other one of said first layer segments and their anodes connected respectively to said third layer segments, said third layer also having an additional conducting segment lying in the same plane as said first mentioned third layer segments, additional diodes corresponding to the number of phases of said rectifier mounted on top of said first mentioned third layer segments and having one terminal of which connected to said first mentioned third layer segments respectively, said additional third layer segment being electrically connected to the other terminal of each of said additional diodes.

* * * * *